United States Patent
O'Neil et al.

(10) Patent No.: US 10,361,818 B2
(45) Date of Patent: Jul. 23, 2019

(54) MESSAGE DROPOUT MINIMIZATION WHEN TRANSPORTING ISOCHRONOUS PACKETS ACROSS A PLESIOCHRONOUS BOUNDARY

(71) Applicant: Hamilton Sundstrand Corporation, Charlotte, NC (US)

(72) Inventors: John M. O'Neil, Litchfield, CT (US); Patricia M. Ahearn-Heyse, Suffield, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 189 days.

(21) Appl. No.: 15/406,280

(22) Filed: Jan. 13, 2017

(65) Prior Publication Data

US 2018/0205499 A1    Jul. 19, 2018

(51) Int. Cl.
| | |
|---|---|
| *H04L 1/00* | (2006.01) |
| *H04L 7/00* | (2006.01) |
| *H04L 5/00* | (2006.01) |
| *G06F 11/07* | (2006.01) |
| *H04L 12/40* | (2006.01) |

(Continued)

(52) U.S. Cl.
CPC ............ *H04L 1/0089* (2013.01); *G06F 11/07* (2013.01); *H04L 1/00* (2013.01); *H04L 5/0085* (2013.01); *H04L 7/0008* (2013.01); *H04L 12/40* (2013.01); *H04L 1/201* (2013.01);
(Continued)

(58) Field of Classification Search
None
See application file for complete search history.

(56) References Cited

U.S. PATENT DOCUMENTS 7,023,801 B1 *   4/2006   Hollins ............. H04L 12/40058
                                                           370/230
8,855,258 B1   10/2014   Do et al.
(Continued)

FOREIGN PATENT DOCUMENTS

EP        2139172 A1    12/2009
EP        2797263 A1    10/2014
(Continued)

OTHER PUBLICATIONS

Extended European Search Report for European Patent Application No. EP18151232.8, dated Jun. 7, 2018.

*Primary Examiner* — Otis L Thompson, Jr.
(74) *Attorney, Agent, or Firm* — Locke Lord LLP; Scott D. Wofsy; Judy R. Naamat

(57) ABSTRACT

A system for reducing message dropout rate in a communication system is provided. Message dropouts occur during transportation of isochronous datasets across a plesiochronous boundary. The system includes a first processing element configured to operate in response to a first clock signal at a first clock speed. The system further includes a second processing element configured to operate in response to a second clock signal at a second clock speed, different from the first clock speed. The second processing element is operably connected to the first processing element by a data bus. The first processing element and the second processing element are configured to indicate a fault when no dataset is received during a processing interval. If two different datasets are received within the same processing interval one of the two datasets is dropped.

22 Claims, 2 Drawing Sheets

(51) Int. Cl.
    *H04W 4/04* (2009.01)
    *H04L 1/20* (2006.01)
(52) U.S. Cl.
    CPC ................ *H04L 2012/4028* (2013.01); *H04L 2012/40215* (2013.01); *H04W 4/046* (2013.01)

(56) References Cited

U.S. PATENT DOCUMENTS

| | | | |
|---|---|---|---|
| 2006/0143345 A1* | 6/2006 | Fredriksson | G06F 1/14 710/106 |
| 2012/0176895 A1* | 7/2012 | Jiang | H04L 12/40013 370/230.1 |
| 2012/0177059 A1* | 7/2012 | Jiang | H04L 47/6275 370/428 |

FOREIGN PATENT DOCUMENTS

| | | |
|---|---|---|
| EP | 2827536 A1 | 1/2015 |
| WO | WO-2012101229 A1 | 8/2012 |

* cited by examiner

MESSAGE DROPOUT MINIMIZATION WHEN TRANSPORTING ISOCHRONOUS PACKETS ACROSS A PLESIOCHRONOUS BOUNDARY

FIELD OF THE INVENTION

The present invention relates to telecommunications systems, and more particularly, to message dropout minimization when transporting isochronous packets across a plesiochronous boundary.

BACKGROUND OF THE INVENTION

When isochronous (recurring at regular intervals) data crosses a plesiochronous (closely matched in time or frequency) boundary the ends often observe a phase slip. The phase slip results in either a missing data packet for one time period (frame) or two different data packets receives in on one period. In one case a gap in data is observed (missing packet error), in the other case one packet must be discarded. If there is jitter on either the transmitter or receiver sides, or both, the errors may continually occur over a relatively long period of time. If the communication link is bidirectional (full duplex), both errors could occur. Known methods to address this issue typically implement jitter buffers that can be used to cross the gap and absorb the additional data packets. However, this technique causes additional delay in data transport.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a system for reducing message dropout rate in a telecommunication system is provided. Message dropouts occur during transportation of isochronous datasets across a plesiochronous boundary. The system includes a first processing element configured to operate in response to a first clock signal at a first clock speed. The system further includes a second processing element configured to operate in response to a second clock signal at a second clock speed, different from the first clock speed. The second processing element is operably connected to the first processing element by a data bus. The first processing element and the second processing element are configured to indicate a fault when no dataset is received during a processing interval. If two different datasets are received within the same processing interval one of the two datasets is dropped.

BRIEF DESCRIPTION OF THE DRAWINGS

So that those having ordinary skill in the art, to which the present invention pertains, will more readily understand how to employ the novel system and methods of the present certain illustrated embodiments, the embodiments thereof will be described in detail herein-below with reference to the drawings, wherein.

DETAILED DESCRIPTION OF CERTAIN EMBODIMENTS

Figure 1:
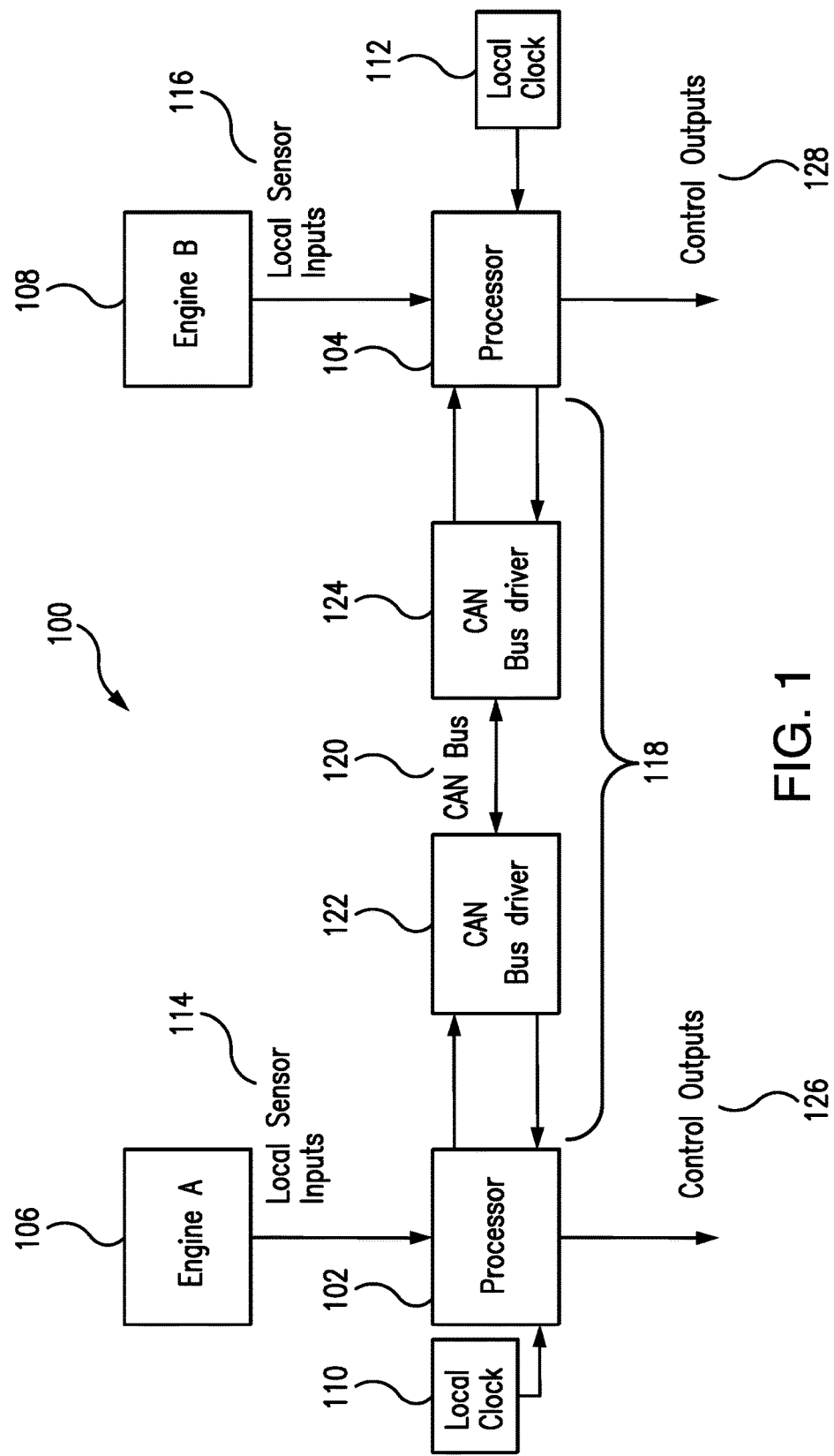
FIG. 1 is a system diagram illustrating a communication system which is a component of aircraft engine control system in accordance with illustrative embodiments of the present invention.

It is to be appreciated that the below described embodiments are not limited in any way to what is shown in the Figures, and instead, can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the certain illustrated embodiments. Furthermore, the terms and phrases used herein are not intended to be limiting but rather to provide an understandable description of the certain illustrated embodiments.

Unless defined otherwise, all technical and scientific terms used herein have the same meaning as commonly understood by one of ordinary skill in the art to relating to below illustrated embodiments. Although any methods and materials similar or equivalent to those described herein can also be used in the practice or testing of the below illustrated embodiments, exemplary methods and materials are now described.

It must be noted that as used herein and in the appended claims, the singular forms "a," "an," and "the" include plural referents unless the context clearly dictates otherwise. Thus, for example, reference to "a stimulus" includes a plurality of such stimuli (and equivalents known to those skilled in the art) and reference to "the signal" includes reference to one or more signals (and equivalents thereof known to those skilled in the art), and so forth.

It is to be appreciated the certain embodiments described herein are preferably utilized in conjunction with a software algorithm, program or code residing on computer useable medium having control logic for enabling execution on a machine having a computer processor. The machine typically includes memory storage configured to provide output from execution of the computer algorithm or program. As used herein, the term "software" is meant to be synonymous with any code or program that can be in a processor of a host computer, regardless of whether the implementation is in hardware, firmware or as a software computer product available on a disc, a memory storage device, for download from a remote machine, etc.

As used herein a signal is said to be "isochronous" if the time interval separating any two significant instants is theoretically equal to the unit interval, or to a multiple of the unit interval. As used herein, two signals are "plesiochronous" if their corresponding significant instants occur at nominally the same rate. For example: two signals having the same bit rate but whose timing comes from separate clocks may be considered plesiochronous.

As used herein, the term "processor" is to be broadly construed to include any type of embedded processor.

Embodiments of the present invention contemplate that by detecting when a crossover of the phase is about to occur, the receiving instant in the transmission cycle may be moved in the opposite direction of the phase skew. This rearrangement forces separation between the received packet data flow and the actual processing of the received packets. One error would occur at this transition point. Furthermore, when the received packet data flow is in the opposite phase of the transmission cycle from the actual data processing, the processing may be dynamically restored to the original timing. No error will occur at this transition point. In other words, disclosed herein self-synchronizing technique with respect to the received data flow removes the necessity for the local processes to detect both the direction and magnitude of the phase slip.

Referring now to FIG. 1, there is illustrated an exemplary aircraft engine control system 100 for an aircraft with two engines. This embodiment has two processors 102 and 104 corresponding to respective engines 106 and 108. Each one of the processors can independently control its associated engine. Each processor 102, 104 includes a dedicated local clock 110 and 112, respectively. However, a drawback of this approach relates to the fact that these systems are plesiochronous, or "nearly" synchronous; i.e., timing reference signals are arbitrarily close in frequency (within some specified limits), but are not sourced from the same clock signal. Thus, over some period of time, the timing reference signals drift with respect to each other.

Each engine 106 and 108 includes a core engine portion (not shown), a plurality of sensors (not shown) that are responsive to engine operations and capable of providing information related to engine speed and state, and a plurality of environmental sensors (not shown) for sensing environmental conditions, such as, but not limited to, ambient air temperature/pressure and altitude. In order for the two engines 106 and 108 to operate similarly, the engine states and some substantially real time sensor data is shared between the respective processing elements 102 and 104. These processing elements 102 and 104 alter engine operations based on the inputs 114 and 116 received from the environmental sensors and the aircraft engine sensors. A cross-engine data link 118 transfers values of the critical engine condition variables directly between the processing elements 102 and 104.

In one embodiment, the cross-engine data link 118 includes a controller area network ("CAN") bus 120 which provides the exchange of signals, information, and/or data. The CAN bus 120 provides a point-to-point connection between two ends. The processing elements 102 and 104 can acquire data transmitted via the CAN bus 120 to dynamically adjust one or more aircraft operating parameters to substantially achieve various operating characteristics of the respective engines 106 and 108.

The message exchange patterns for the cross-engine data link 118 can differ. Message exchange patterns include, for example, half duplex (i.e., shared channel) or full duplex. In one embodiment, the messages are transmitted at the same point in the processing frame (isochronous) using half-duplex frames via the half-duplex cross-engine data link 118. Each dataset (packet) includes a plurality of messages containing small amount of data. In the exemplary embodiment, each dataset is fragmented into nine messages and each message contains 8 bytes of payload data for the CAN bus 120. Furthermore, each of the processing elements 102 and 104 are configured to produce control output signals 126 and 128, respectively.

It should be noted that no dataset buffers are utilized in the exemplary communication system in order to maintain or minimize latency between the processing elements 102 and 104 which further facilitates close matching of the state of the engines 106 and 108 and sensor data. However, this results in multiple message timing slips (referred to hereinafter as cycle slips) as the frame timing crosses between the two processing elements 122 and 124.

According to embodiments of the present invention, in order to correct the data for these cycle slips and minimize cross-engine CAN errors during phase crossings, data processing of the received data is adjusted in a dynamic manner. Each cycle includes a period of time during which exactly one dataset is transmitted by each side. In one embodiment, this processing interval comprises 24 milliseconds. As message reception time for the last message in a dataset continues to slide, once these cycle slips reach a particular point in time, i.e., millisecond 12, various embodiments of the present invention contemplate dynamic adjustment of data processing. To implement dynamic adjustment of data processing various embodiments of the present invention contemplate utilization of two specific signals. A first signal enables control of processing of the received dataset to occur during a predefined time instant, such as millisecond 21 or millisecond 23, before the transmission cycle/processing interval rolls back to millisecond zero. A second signal enables toggling of the first signal, when the last message is received in another predefined time instant, such as millisecond 12. In other words, the first signal selects whether the received data is processed in either millisecond 21 or 23, while the second signal toggles the first signal.

Figure 2:
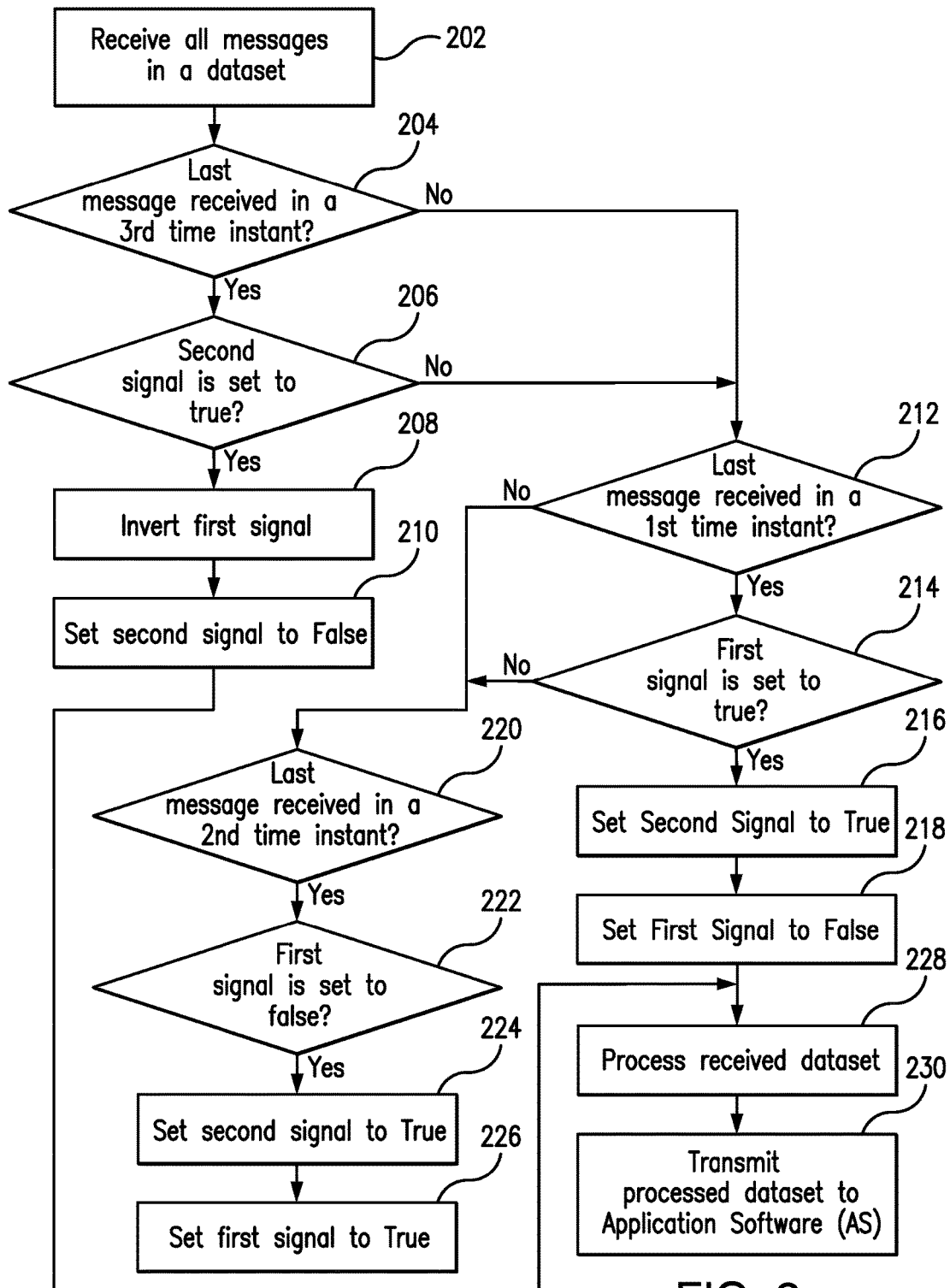
FIG. 2 is a flowchart of operational steps for reducing message dropout rate in the communication system of FIG. 1 in accordance with illustrative embodiments of the present invention.

FIG. 2 is a flowchart of operational steps for concurrent processing of streams of input data in accordance with illustrative embodiments of the present invention. Before turning to description of FIG. 2, it is noted that the flow diagram shown therein is described, by way of example, with reference to components shown in FIG. 1, although these operational steps may be carried out in any system and are not limited to the scenario shown in the aforementioned figure. It should be appreciated that in some embodiments some of the steps described below may be combined into a single step. In some embodiments, one or more additional steps may be included. While the description of the details of some embodiments will be described with reference to the first processing element 102, it should be understood that exactly the same sequence of steps may also be used advantageously by the second processing element 104 to process the received datasets.

At step 202, the first processing element 102 periodically receives datasets from the second processing element 104 as described above in conjunction with FIG. 1. In one exemplary embodiment, each transmission takes approximately 24 milliseconds and each dataset is fragmented into nine messages. Each transmitted dataset may include corresponding engine states' and/or at least some sensor data. At least in some embodiments, the first processing element 102 may include a polling agent. The polling agent is operative for polling the CAN mailboxes that can be part of the CAN bus driver 122 for identifying and retrieving any newly arrived messages. In one embodiment each CAN bus driver 122 can include up to 64 mailboxes.

As the first processing element 102 continues to receive messages in the dataset being transmitted, at step 204, the first processing element 102 determines whether the last message was received during a third time instant. In this embodiment, the third instant comprises 12th millisecond of the processing interval. In response to determining that the last message of the dataset is received during the third time instant (decision block 204, "Yes" branch), the first processing element 102 selectively inverts the first signal (controlling the data processing time selection) depending on the second signal.

In one embodiment, at step 206, the first processing element 102 determines whether the second signal is enabled. This second signal comprises a toggle signal and is used to control when the first signal is to toggle between "True" (enable) and "False" (disable) values. In response to determining that the second signal is enabled (decision block 206, "Yes" branch), at step 208, the first processing element 102 inverts the first signal. Next, at step 210, the first processing element 102 resets the second signal back to "False" value. In this scenario all of the messages in the received dataset (packet) are processed and no packets are dropped.

In response to determining that the last message is not received in the third time instant (decision block 204, "No" branch) or that the last message is received in the 3rd time instant but the second signal is disabled (decision block 206, "No" branch), at step 212, the first processing element 102 determines whether the last message was received during a first time instant. In this embodiment, the first instant comprises 21st millisecond of the processing interval. In response to determining that the last message of the dataset is received during the first time instant (decision block 212, "Yes" branch), the first processing element 102 selectively processes the received dataset during the first instant, depending on the value of the first signal.

In one embodiment, at step 214, the first processing element 102 determines whether the first signal is enabled. As noted above, this first signal selects whether the received data is processed in either millisecond 21 or 23. In response to determining that the first signal is enabled (decision block 214, "Yes" branch), at step 216, the first processing element 102 toggles the second signal to 'True". Next, at step 218, the first processing element 102 resets the second signal back to "False" value. In this scenario all of the messages in the received dataset (packet) are processed and no packets are dropped.

According to an embodiment of the present invention, in response to determining that the last message is not received in the first time instant (decision block 212, "No" branch) or that the last message is received in the first time instant but the first signal is disabled (decision block 214, "No" branch), at step 220, the first processing element 102 determines whether the last message was received during a second time instant. In this embodiment, the second time instant comprises 23rd millisecond of the processing interval. In response to determining that the last message of the dataset is received during the second time instant (decision block 220, "Yes" branch), the first processing element 102 selects whether to process or drop the dataset received during the second time instant, depending on the value of the first signal.

In one embodiment, at step 222, the first processing element 102 determines whether the first signal is disabled. In other words, the first processing element 102 determines whether one dataset has been already processed in millisecond 21. In response to determining that the first signal is disabled (decision block 222, "Yes" branch), at step 224, the first processing element 102 toggles the second signal to 'True". Next, at step 226, the first processing element 102 resets the first signal back to "True" value. In this scenario, if the first signal is set to true, the second packet received during the same processing interval is dropped.

Next, after resetting the first and second signals to appropriate values (steps 208, 210 or 216, 218 or 224,226), at 228, the first processing element 102 processes the received packet (at either 21st or 23rd millisecond as noted above). In one embodiment, this step may involve assembling data from the plurality of messages (packet fragments) into a coalesced packet (dataset). The processing step 228 may further involve some additional actions. For instant, each message may include a header frame check sequence (FCS) immediately following the length of message field. The frame check sequence field serves to detect errors induced by the transmission data link 118 and to validate the transmission accuracy. The frame check sequence results from a mathematical computation on the digital value of all binary bits in the frame following the frames synchronization sequence. The process is known as cyclic redundancy checking using a particular generator polynomial. The remainder value in the transmitter for the polynomial is initialized to all ones before a message is transmitted. The binary value of the transmission is premultiplied by a predetermined factor and then divided by the generator polynomial. Integer quotient values are ignored in the transmitter since the complement of the resulting remainder value, high order bit first, is sent as the frame check sequence field. At the receiver end, the initial remainder is preset to all ones and the same process is applied to the serial incoming bits. In the absence of transmission errors, the final remainder is a predetermined value. The receiving processing element, such as the first processing element 102, will discard a packet with messages not having that predetermined remainder value.

After the processed dataset have undergone and passed all tests, at step 230, the first processing element 102 transmits the processed dataset to application software in communication with the processor 102.

In summary, according to embodiments of the present invention, to resolve the data loss in a data communication system due to a receiver and transmitter using different clock sources, the technique disclosed above stabilizes data transmission by forcing separation between the received packet data flow and the actual processing of the received packets. The disclosed technique includes two controls where each end monitors the state of the other system to provide similar outputs in real-time. Advantageously, a single packet error occurs at the cross-over rate over the communication data link, while single packet latency is maintained. In contrast, alternative buffering technique results in multiple packets being lost when buffers are refilled or re-centered. For instant, the system using buffering technique can buffer the frame, perhaps overwriting any previously-buffered frame. In such conventional system, with no specific control algorithm in place, the packets are passed as they are received, typically resulting in either multiple gaps or double packet receptions occurring while the transmitter and receiver phases pass each other. For instant, for 10 ppm (parts per million) clock difference, 25 millisecond frames and around 25 microsecond transmission/reception jitter, around two hundred errors can occur over 5 seconds at 42 minute intervals.

The techniques described herein are exemplary, and should not be construed as implying any particular limitation of the certain illustrated embodiments. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more features, integers, steps or components or groups thereof.

Although the systems and methods of the subject invention have been described with respect to the embodiments disclosed above, those skilled in the art will readily appreciate that changes and modifications may be made thereto without departing from the spirit and scope of the certain illustrated embodiments as defined by the appended claims.

What is claimed is:

1. A system for reducing message dropout rate in a telecommunication system, the message dropout occurring when transporting isochronous datasets across a plesiochronous boundary, the system comprising:
    a first processing element configured to operate in response to a first clock signal
    at a first clock speed;
    a second processing element configured to operate in response to a second
    clock signal at a second clock speed different from the first clock speed, the second processing element operably connected to the first processing element by a data bus; and
    the data bus for transporting the isochronous datasets between the first and
    second processing elements, one isochronous dataset being transported per processing interval of a plurality of processing intervals,
    wherein the first processing element and the second processing element are
    configured to indicate a fault when no dataset of the isochronous datasets is received during a processing interval of the plurality of processing intervals or wherein if two different datasets of the isochronous datasets are received within the same processing interval one of the two datasets is dropped.

2. The system of claim 1, wherein the first processing element and the second processing element are configured to dynamically reset processing of a received dataset of the isochronous datasets by selectively activating a first signal enabling processing of the received dataset to occur during a predetermined time instant of the processing interval and by selectively activating a second signal enabling toggling of the first signal between two settings.

3. The system of claim 2, wherein the processing interval is equal to x milliseconds, a first time instant comprises a x b millisecond of the processing interval, a second time instant comprises a x-a millisecond of the processing interval and a third time instant comprises a x-c millisecond of the processing interval, wherein a<b<c.

4. The system of claim 3, wherein the first processing element and the second processing element are configured to enable the second signal if the first signal is disabled and if the last segment of the dataset is received during the second time instant.

5. The system of claim 3, wherein the first processing element and the second processing element are configured to enable the first signal if the first signal is disabled and if the last segment of the dataset is received during the second time instant.

6. The system of claim 3, wherein the first processing element and the second processing element are configured to enable the second signal if the first signal is enabled and if the last segment of the dataset is received during the first time instant.

7. The system of claim 3, wherein the first processing element and the second processing element are configured to disable the first signal if the first signal is enabled and if the last segment of the dataset is received during the first time instant.

8. The system of claim 3, wherein the first processing element and the second processing element are configured to enable the first signal if the first signal is disabled and if the second signal is enabled and if the last segment of the dataset is received during the third time instant.

9. The system of claim 3, wherein the first processing element and the second processing element are configured to disable the first signal if the first signal is enabled and if the second signal is enabled and if the last segment of the dataset is received during the third time instant.

10. The system of claim 3, wherein the first processing element and the second processing element are configured to disable the second signal if the second signal is enabled and if the last segment of the dataset is received during the third time instant.

11. The system of claim 2, wherein selection of activation of at least one of the first and second signals is based on when in the processing interval the predetermined time instance occurred.

12. A system for reducing message dropout rate in a telecommunication system, the message dropout occurring when transporting isochronous datasets across a plesiochronous boundary, the system comprising:
    a first processing element configured to operate in response to a first clock signal at a first clock speed; and
    a second processing element configured to operate in response to a second clock signal at a second clock speed different from the first clock speed, the second processing element operably connected to the first processing element by a data bus of an aircraft communication system, wherein:
    the first processing element and the second processing element are
    configured to indicate a fault when no dataset of the isochronous datasets is received during a processing interval of the plurality of processing intervals or wherein if two different datasets of the isochronous datasets are received within the same processing interval one of the two datasets is dropped,
    one isochronous dataset of the isochronous datasets is transmitted per processing interval of a plurality of processing intervals, and
    the first processing element is operably connected to a first aircraft engine and is configured to receive engine data via the isochronous datasets relating to operation of a second aircraft engine and wherein the second processing element is operably connected to the second aircraft engine via the isochronous datasets and is configured to receive engine data relating to operation of the first aircraft engine.

13. The system of claim 12, wherein for the first engine and the second engine each is operably connected to at least one sensor and wherein the engine data comprises at least respective engine states and at least some data received from the at least one sensor.

14. A system for reducing message dropout rate in a telecommunication system, the message dropout occurring when transporting isochronous datasets across a plesiochronous boundary, the system comprising:
    a first processing element configured to operate in response to a first clock signal at a first clock speed; and
    a second processing element configured to operate in response to a second clock signal at a second clock speed different from the first clock speed, the second processing element operably connected to the first processing element by a data bus, wherein:
the first processing element and the second processing element are configured to indicate a fault when no dataset of the isochronous datasets is received during a processing interval of the plurality of processing intervals or wherein if two different datasets of the isochronous datasets are received within the same processing interval one of the two datasets is dropped,
one isochronous dataset of the isochronous datasets is transmitted per processing interval of a plurality of processing intervals, and
the dataset is fragmented into a plurality of messages and wherein a last segment comprises the last message of the dataset.

15. The system of claim 14, wherein determination of receipt of an isochronous dataset is based on whether the last segment of the isochronous dataset was received.

16. A method for reducing message dropout rate in a telecommunication system, the message dropout occurring when transporting isochronous datasets across a plesiochronous boundary, the method comprising:
transmitting a dataset from a first processing element to a second processing element wherein the first processing element is configured to operate in response to a first clock signal at a first clock speed;
transmitting another dataset from the second processing element to the first processing element, wherein the second processing element is configured to operate in response to a second clock signal at a second clock speed different from the first clock speed;
transporting the isochronous datasets between the first and second processing elements, one isochronous dataset being transported per processing interval of a plurality of processing intervals;
indicating a fault by at least one of the processing elements when at least one dataset is not received by the at least one of the processing elements during a processing interval of the plurality of processing intervals; and
dropping a dataset if two different datasets of the isochronous datasets are received within the same processing interval by one of the processing elements.

17. The method of claim 16, wherein the dataset is fragmented into a plurality of messages and wherein a last segment comprises the last message of the dataset.

18. The method of claim 17, further comprising dynamically resetting processing of a received dataset of the isochronous datasets by selectively activating a first signal enabling processing of the received dataset to occur during a predetermined time instant of the processing interval and by selectively activating a second signal enabling toggling of the first signal between two settings by the first and second processing elements.

19. The method of claim 18, wherein the processing interval is equal to x milliseconds, a first time instant comprises a x b millisecond of the processing interval, a second time instant comprises a x-a millisecond of the processing interval and a third time instant comprises a x-c millisecond of the processing interval, wherein a<b<c.

20. The method of claim 19, further comprising:
enabling, by the first processing element and the second processing element, the second signal if the first signal is disabled and if the last segment of the dataset is received during the second time instant; and
enabling, by the first processing element and the second processing element, the first signal if the first signal is disabled and if the last segment of the dataset is received during the second time instant.

21. The method of claim 20, further comprising:
enabling, by the first processing element and the second processing element, the second signal if the first signal is enabled and if the last segment of the dataset is received during the first time instant; and
disabling, by the first processing element and the second processing element, the first signal if the first signal is enabled and if the last segment of the dataset is received during the first time instant.

22. The method of claim 21, further comprising:
enabling, by the first processing element and the second processing element, the first signal if the first signal is disabled and if the second signal is enabled and if the last segment of the dataset is received during the third time instant;
disabling, by the first processing element and the second processing element, the first signal if the first signal is enabled and if the second signal is enabled and if the last segment of the dataset is received during the third time instant; and
disabling, by the first processing element and the second processing element, the second signal if the second signal is enabled and if the last segment of the dataset is received during the third time instant.

* * * * *